United States Patent
Khun-Jush et al.

(10) Patent No.: US 7,406,051 B2
(45) Date of Patent: Jul. 29, 2008

(54) INTERFERENCE MEASUREMENTS IN A WIRELESS COMMUNICATIONS SYSTEM

(75) Inventors: Jamshid Khun-Jush, Nürnberg (DE); Gerd Zimmermann, Eckental (DE); Mathias Pauli, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 512 days.

(21) Appl. No.: 10/497,205

(22) PCT Filed: Nov. 30, 2001

(86) PCT No.: PCT/EP01/14010

§ 371 (c)(1),
(2), (4) Date: Dec. 6, 2004

(87) PCT Pub. No.: WO03/047290

PCT Pub. Date: Jun. 5, 2003

(65) Prior Publication Data

US 2005/0083962 A1     Apr. 21, 2005

(51) Int. Cl.
   H04J 1/16      (2006.01)
   H04L 12/413    (2006.01)
   H04B 1/00      (2006.01)
(52) U.S. Cl. ................. 370/252; 370/445; 455/63.1
(58) Field of Classification Search ......... 370/252, 370/445–448, 461, 337; 455/63.1, 296, 114.2
   See application file for complete search history.

(56) References Cited

U.S. PATENT DOCUMENTS

| 5,574,979 A | * | 11/1996 | West ................ 455/63.1 |
| 5,657,326 A | | 8/1997 | Burns et al. |
| 5,721,725 A | | 2/1998 | Want et al. |
| 7,095,754 B2 | * | 8/2006 | Benveniste ............. 370/465 |
| 2005/0083962 A1 | * | 4/2005 | Khun-Jush et al. .......... 370/445 |

FOREIGN PATENT DOCUMENTS

| EP | 1 137 203 | 9/2001 |
| WO | WO 00/22783 | 4/2000 |

OTHER PUBLICATIONS

Liu et al, "Towards High Performance Modeling of the 802.11 Wireless Protocol", Department of Computer Science & Institute for Security Technology Studies, Dartmouth College, Hanover, NH 03755 U.S.A. 2001.

ERC (European Radiocommunications Committee) Decision of Nov. 29, 1999, on the harmonised frequency bands to be designated for the introduction of High Performance Radio Local Area Networks (HIPERLANs).

* cited by examiner

*Primary Examiner*—Huy D. Vu
*Assistant Examiner*—Nittaya Juntima
(74) *Attorney, Agent, or Firm*—Nixon & Vanderhye, P.C.

(57) ABSTRACT

Interference Measurements in a Wireless Communications System A method and a transmitting unit for performing an interference measurement in a multiple access wireless communications system utilizing a carrier sensing technique is described. In accordance with the carrier sensing technique, it is monitored during a sensing period ($T_{min}$) if a carrier is idle. A continuous or quasi-continuous interference measurement is performed on the carrier during a measurement period ($T_M$) which is typically longer than the sensing period ($T_{min}$). While performing the interference measurement, pulses are transmitted on the carrier such that an interval between the end of a pulse and the beginning of the next pulse is typically shorter than the sensing period ($T_{min}$). The interference measurements preferably relate to detection of interference from radar signals or radar like signals.

22 Claims, 3 Drawing Sheets

INTERFERENCE MEASUREMENTS IN A WIRELESS COMMUNICATIONS SYSTEM

This application is the US national phase of international application PCT/EP01/14010 filed 30 Nov. 2001 which designated the U.S., the entire content of which is hereby incorporated by reference.

BACKGROUND OF THE INVENTION

1. Technical Field

The present invention relates to the field of interference measurements. In particular, the invention relates to a method of performing interference measurements in a multiple access wireless communications system utilizing a carrier sensing technique for monitoring during a sensing period if a carrier is idle. The invention further relates to a transmitting unit implementing such a method and a wireless communications system comprising this transmitting unit.

2. Discussion of the Prior Art

Wireless communications systems require access schemes which define how individual system components may share available system resources like frequency bands. Multiple access control protocols are techniques that allow individual system components to temporarily access available system resources on a demand basis.

Examples of multiple access control protocols are Carrier Sense Multiple Access (CSMA) schemes like CSMA with Collision Detection (CSMA/CD) and CSMA with Collision Avoidance (CSMA/CA). CSMA is based on a carrier sensing scheme which allows a plurality of system components to share one or more carriers for the purpose of transmitting information. Only when a system component "senses" that a carrier is idle, i.e., that there is no traffic on the carrier, can it start its transmission. Once a system component transmits on the carrier, no other system component can transmit until the carrier becomes idle again. In accordance with the multiple access aspect, many system components simultaneously attempt to transmit, and each system component first listens (or senses) to detect any possible collisions. The period of time during which a system component senses a carrier prior to transmission (sensing period) may be constant for all system components or may be individually determined.

As has become apparent from the above, CSMA is an efficient method for sharing one or more carriers among individual components of a wireless communications system. However, specific frequency bands are often shared not only among individual components of one and the same wireless communications system, but among a plurality of wireless communications systems and further users like radar systems and the like. For example the ISM frequency band (2,4 GHz) is concurrently used by the wireless communications systems IEEE 802.11b and Bluetooth. Another example is the 5 GHz frequency band which in Europe is used by the High PErformance Radio Local Area Network type 2 (HIPERLAN/2, or simply H/2) and radar systems. In the near future further wireless communications systems like the IEEE 802.11a system, which uses CSMA/CA, might operate in the 5 GHz frequency band also.

If a plurality of different systems has to share one and the same frequency band, collisions among these systems have to be prevented. To that end, Dynamic Frequency Selection (DFS) as required for example for the 5 GHz frequency band by the European Radio Communications Committee in the decision ERC/DEC/(99)23 may be implemented. DFS incorporates dynamic frequency adaption to local interference conditions. The task of DFS is to perform interference measurements and to select the least interfered carrier for transmission. DFS thus allows to avoid co-channel operation with other systems. A common implementation of DFS is to periodically measure interference on the carrier used for transmission and all other available carriers and to automatically select a new carrier in the case the currently used carrier is suddenly disturbed by an interferer and a less disturbed carrier is available. Consequently, DFS guarantees a high transmission quality on the one hand and avoids interference with other systems on the other hand.

Any kind of DFS for CSMA systems like IEEE 802.11a is currently neither supported nor standardized. One reason therefore is that the CSMA mechanism is difficult to combine with longterm interference measurements. This is a result of the fact that the interference measurement periods cannot be longer than the sensing period since otherwise an interference measurement for a carrier performed by a first transmitting unit could be interpreted as idle time by a second transmitting unit in the close vicinity. The second transmitting unit may thus start to transmit on this carrier, which will disturb the interference measurement performed by the first transmitting unit. The measuring first transmitting unit may for example interpret the transmission of the second transmitting unit as radar interference and may hence skip this carrier, which is both unwanted and unnecessary.

Such a misinterpretation of the measuring transmitting unit can be avoided if the measuring unit can decode the interference signal. When the measuring unit thus detects that the interference is caused by another component of the same wireless communications system, it will not interpret the interference as radar interference. This helps to reduce the false alarm probability, but it cannot avoid that the interference measurement is interrupted for an unpredictable period of time, which renders the interference measurement rather unreliable.

In order to avoid the interpretation of the measurement period as idle time one could also think about extending the sensing period or decreasing the measurement period such that the measuring period does not exceed the sensing period. The sensing period, however, cannot be significantly extended without decreasing the transmission capacity. On the other hand, the measurement period cannot be reduced just as one likes without decreasing the probability of detecting rare interferences like periodical interferences with a comparatively large interval between two subsequent interferences, such as radar signals.

One object of the present invention is to provide an improved method of performing an interference measurement in a multiple access wireless communications system utilizing a carrier sensing technique.

A further object of the invention is to provide a transmitting unit for a wireless communications system implementing this method and a wireless communications system comprising such a transmitting unit.

BRIEF SUMMARY

A method is provided of performing interference measurements in a multiple access wireless communications system utilizing a carrier sensing technique for monitoring during a sensing period if a carrier is idle. The method comprises performing a continuous or quasi-continuous interference measurement on the carrier during a measurement period which is typically longer than the sensing period, and, while performing the interference measurement, transmitting pulses on the carrier such that an interval between the end of a pulse and the beginning of the next pulse is typically shorter than the sensing period.

Transmitting or emitting pulses on the carrier while performing interference measurements on the carrier ensures that the measurement period will not be interpreted as idle time by other components of the wireless communications system. This enables to utilize a measurement period which exceeds the sensing period while at the same time other system components are prevented from transmitting, i.e., from disturbing the interference measurement. If the wireless communications system comprises a plurality of transmitting units, a first transmitting unit which preferably controls carrier selection may additionally perform or control the interference measurements according to an example embodiment (including transmission of the pulses). A second transmitting unit of the same wireless communications system refrains from transmitting upon detection of one or more of the pulses from the first or a further transmission unit.

According to an example embodiment, the measurement period is chosen such that it is typically longer than the sensing period. Simultaneously, the interval between the end of a pulse and the beginning of the next pulse is chosen such that it is typically shorter than the sensing period. The terms "typically" are used here because the sensing period is usually no constant parameter but may vary from one system component to another and may even vary for a single system component from one transmission to the next transmission. However, it is generally possible to estimate the typical length of a sensing period used in a specific wireless communications system. Such an estimate of the sensing period can then be used as a lower limit for the measurement period and as an upper limit for the interval between the end of a pulse and the beginning of the next pulse. In general it would suffice if those limits apply for a large majority of the sensing periods employed across the wireless communications system. Instead of using an estimate of the sensing period as limit for the measurement period and the interval between the end of a pulse and the beginning of the next pulse, the minimum sensing period specified for a specific wireless communications system can be used.

The interference measurements are performed either continuously during a single, uninterrupted measurement interval or quasi-continuously. A quasi-continuous measurement comprises a plurality of measurement intervals, wherein the duration of a single measurement interval is long compared to the time interval between two subsequent measurement intervals. The time interval between two subsequent measurement intervals may correspond to the transmission of a pulse. This means that an interference measurement may be temporarily interrupted when a pulse is transmitted. Such an intermittent interruption of a quasi-continuous interference measurement excludes the possibility that a transmitted pulse is erroneously interpreted as interference signal.

If instead of the quasi-continuous interference measurements continuous interference measurements are performed, these measurements may be performed concurrently with the transmission of the pulses. In order to avoid any impeding of the interference measurements, the pulses may be emitted from a device which is separate or remote from the measuring device. However, the interference measurement and the pulse transmission may also be performed by one and the same device, especially in the case of quasi-continuous interference measurements or in the case another mechanism is provided which prevents the transmitted pulses from erroneously being interpreted as interferences by the measuring device.

Preferably, the interference measurements relate to detection of interference from radar signals or radar-like signals. Radar-like signals are signals with typical radar characteristics like a rotating antenna (approximately 4-20 s/360°), a small main lobe (approximately 1°), periodic transmission of short pulses (20 to 10.000 pulses/s), each pulse having a pulse length of approximately 1 ms, and high transmit powers in the order of 26 dBW to 100 dBW. Also, tracking radars are in use which have similar characteristics but do not use a periodically rotating antenna.

If radar signals or radar-like signals are to be detected by the interference measurements, the measurement period may be chosen such that the likelihood of detecting these signals is significant. In other words, the measurement period depends on the expected interval between two subsequent radar emissions. Typically, interference measurements are performed during a measurement period in the order of one or more seconds and preferably for more than 10 seconds.

The pulse duration, which may be constant or which may vary from pulse to pulse, is preferably short compared to the measurement period and the time interval between two subsequent pulses. The interval between the end of a pulse and the beginning of the next pulse may be constant, i.e., the pulses may be transmitted periodically, or may vary. According to an example embodiment the pulses are transmitted quasi-periodically. Such a quasi-periodical pulse transmission is achieved by varying the interval between the end of a pulse and the beginning of a next pulse within a certain range.

Variation of the interval between the end of a pulse and the beginning of the next pulse is advantageous because in the case of periodical pulse transmission the interference might occur with the same period and phase as the transmitted pulses and might thus be hidden forever. Preferably, the variation of the interval between the end of a pulse and the beginning of the next pulse is accomplished randomly.

During transmission of a plurality of pulses, the pulse power may remain constant or may vary. Preferably, the transmit power of the pulses is reduced compared to the transmit power in the "regular" mode of operation. The transmit power of the pulses may be decreased to a level that lies below a specific Radar Detection Threshold (RDT) of such system components which are not to be influenced by the pulses, for example of system components belonging to neighboring wireless communications networks. Reduction of the transmit power of the pulses reduces the system interference and especially the interference to radar systems.

If a variation of the transmit power of the pulses is envisaged, various schemes can be employed. For example power ramping schemes according to which the transmit power is gradually increased or gradually decreased may be used. Preferably, the transmit power variation is performed stepwise.

The transmit power may be varied in dependence of detection of decodable interference signals during the measurement period. As an example, a variation of the transmit power may be initiated each time an interference signal which can be decoded is detected. On the other hand, the transmit power may remain constant if a detected interference signal cannot be decoded, like in the case of radar interferences.

The transmitted pulses may or may not carry information. The information carried by one or more pulses may be non-exploitable dummy information or may be information relating for example to the interference measurement. Preferably, the transmitted information comprises information indicative of when the carrier will become available again, for example information about the remaining measurement period or the remaining duration of a start-up phase.

In principle, the transmitted pulses may all be identical. However, according to an example embodiment two or more different pulse types are provided. For example the pulses transmitted while performing the interference measurement may generally be of a first pulse type which does not carry any exploitable information, i.e., no information at all or dummy information. A second type of pulses which carries information may be transmitted in addition to or instead of one or more pulses of the first type. For example the pulses of the first type can be periodically replaced by longer pulses of the second type which carry information about the remaining duration of the start-up phase. These longer pulses may be decoded by receiving units and enable those receiving units to avoid a constant scanning for the next transmission window.

If during the interference measurement one or more interference signals are detected, it will be helpful to assess the detected interference signals with respect to their origin. For example a distinction can be made whether a detected interference signal originates from a transmitting unit belonging to the receiving unit's or a neighboring wireless communications network on the one hand of from a different interferer like a radar system on the other hand. Such an assessment can be performed by decoding the interference signal. Interference signals resulting for example from radar systems can generally not be decoded whereas interference signals from a similar wireless communications system are usually decodable.

In the following, a possible scenario which necessitates the distinction between different interferers will briefly be discussed. If the interference measurement method described above is to be performed in a regular transmission mode during an idle time with no traffic on the carrier, for example to detect suddenly occurring radar interferences (e.g. from tracking radars) or periodical radar interferences which could not be detected during previous measurement periods, the interference measurement has to be aborted when new traffic occurs on the monitored carrier. Such new traffic can be detected by decoding a received interference signal and by identifying it as a signal from the transmitting unit's own system.

In the scenario described above and in various other scenarios the further course of a current interference measurement may dependend on the nature of the detected interference signal. In the scenario described above the interference measurement is simply aborted upon detection of an interference signal resulting from a further component of the same system. However, in the case a radar or radar-like interference is detected the current interference measurement may simply be continued.

Preferably, the interference measurements described above, including the transmission of pulses, are performed in a scheduled manner like during every system start-up or a predefined period of time after the last interference measurement. If the interference measurements are performed in a scheduled manner, a scheduled interference measurement may be skipped if a predefined period of time prior to this scheduled interference measurement a non-scheduled interference measurement has been performed, for example in a regular transmission mode during an idle time with no traffic on the carrier.

The method outlined above can be implemented both as a hardware solution and as computer program product comprising program code portions for performing the individual steps of the method when the computer program product is run on a computer system. The computer program product may be stored on a computer readable recording medium like a data carrier attached to or removable from the computer system.

The hardware solution is preferably constituted by a transmitting unit of a multiple access wireless communications system utilizing a carrier sensing technique for monitoring during a sensing period if a carrier is idle. The transmitting unit may comprise a subunit for transmitting on the carrier during a measurement period, which is typically longer than the sensing period, a plurality of pulses such that an interval between the end of a pulse and the beginning of the next pulse does not exceed the sensing period.

Such a transmitting unit can be part of a wireless communications system which further comprises a unit for performing a continuous or quasi-continuous interference measurement during measurement period. This unit for performing the interference measurement is preferably a subunit of the transmitting unit. However, the unit for performing the interference measurement may also be a system component separate from the transmitting unit.

BRIEF DESCRIPTION OF THE DRAWINGS

Further advantages of the invention will become apparent upon reference to the following description of preferred embodiments of the invention in the light of the accompanying drawings, in which.

DESCRIPTION OF PREFERRED EMBODIMENTS

Although the present invention can be practiced in any multiple access wireless communications system utilizing a carrier sensing technique, the following description of preferred embodiments is exemplarily set forth with respect to a wireless communications system according to the IEEE 802.11a standard operating in the 5 GHz frequency band.

IEEE 802.11a is a protocol standard for Wireless Local Area Networks (WLAN), that consists of both the physical (PHY) layer and the Medium Access Control (MAC) layer specifications. It provides asynchronous and time-bounded delivery service for wireless connectivity of fixed, portable, and mobile stations.

The IEEE 802.11a MAC layer protocol provides shared access to a wireless channel. A method called Distributed Coordination Function (DCF) is the primary access method, which provides contention-based shared access to the medium. DCF is based on CSMA/CA.

The core mechanism used by DCF is called basic access method and can be summarized as follows. Before a first transmitting unit initiates transmission of a data frame (called MAC Protocol Data Unit, or MPDU), it needs to sense the channel in order to determine whether any other transmitting unit is currently transmitting. The first transmitting unit can proceed with its transmission if the channel is determined to be idle for a certain time interval $T_{min}$ called DIFS (DCF InterFrame Space). This means that the first transmitting unit senses the channel, and as soon as the channel is idle for at least $T_{min}$ it starts to transmit a data frame.

After a data frame is successfully received at the destination, the receiving unit must send an acknowledgement frame (ACK), because the transmitting unit cannot determine whether a frame has been faithfully delivered to its destination by simply listening to the channel. To transmit the ACK, the receiving station waits for the channel to be idle for another time interval called SIFS (Short Inter-Frame Space). If the transmitting unit does not receive an acknowledgement within a certain timeout period, it presumes that the data frame is lost and schedules a re-transmission thereof.

Figure 1:
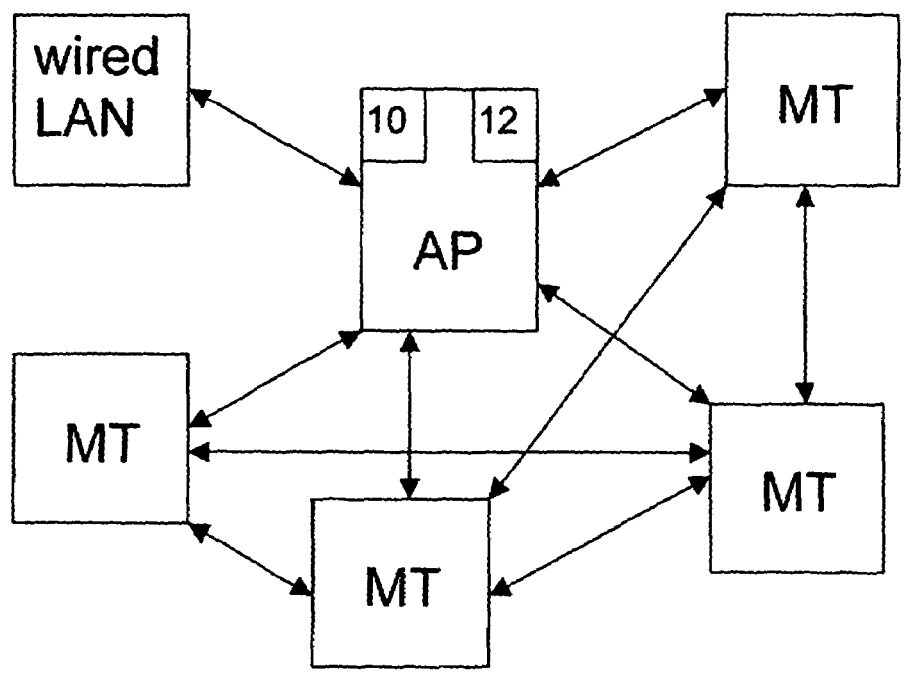
FIG. 1 is a schematic view of a first infrastructure of a wireless communications system in accordance with the IEEE 802.11a standard.

In the following, two different IEEE 802.11a infrastructures will be considered in more detail. The first infrastructure that will be considered is depicted in FIG. 1 and comprises a central Access Point (AP) which controls all communications within the wireless communications system. The AP defines the channel to be used within the wireless communications system and provides both the connection to a wired LAN and the local relay function for associated stations like Mobile Terminals (MT). In the context of the wireless communications system depicted in FIG. 1, the AP is a transmitting unit which comprises both a subunit 10 for transmitting during a measurement period a plurality of pulses and a further subunit 12 which performs a quasi-continuous interference measurement during the measurement period. However, the measuring subunit 12 could also be arranged remote from the AP in order to reduce interference effects with respect to the pulses emitted by the subunit 10 in the case of continuous interference measurements.

Figure 2:
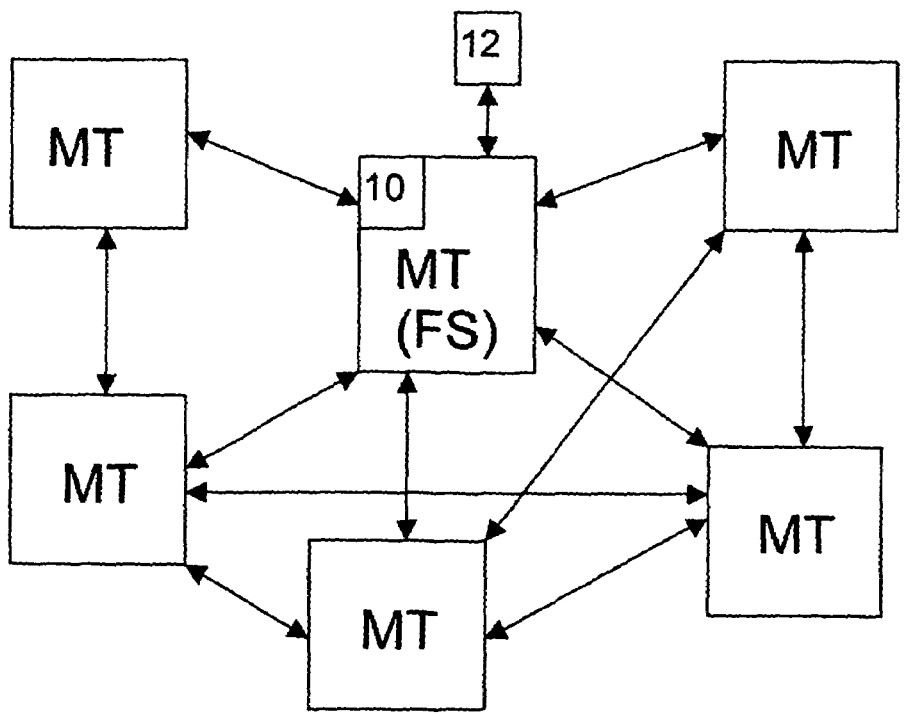
FIG. 2 is a schematic view of a second infrastructure of a wireless communications system in accordance with the IEEE 802.11a standard.

A second IEEE 802.11a infrastructure is depicted in FIG. 2. In FIG. 2 an environment with an Independent Basis Service Set (IBSS) without AP is shown. The channel (or frequency) selection is performed by a Mobile Terminal (MT/FS). The MT/FS comprises a subunit 10 for transmitting pulses. A subunit 12 for performing a quasi-continuous interference measurement is arranged separate from but in communication with the MT/FS. The subunit 12, however, could also be a component located within the MT/FS. In the context of the wireless communications system depicted in FIG. 2, the MT/FS constitutes a transmitting unit.

In the following, the function of the AP depicted in FIG. 1 will be described in more detail. Since this description essentially also applies to the MT/FS shown in FIG. 2, a discussion of the function of the MT/FS will be omitted.

It has been mentioned above that any system operating in the 5 GHz frequency band will have to share this frequency band with radar systems, some of which are mobile. Typical radar systems use rotating antennas with a small main lobe of approximately 1° for horizontal scanning. Due to the small main lobe, radar interferences occur only rarely and are difficult to detect. For a reliable radar detection measurement periods in the order of seconds or even minutes have to be implemented. This situation is depicted in FIG. 3a.

Figure 3A:
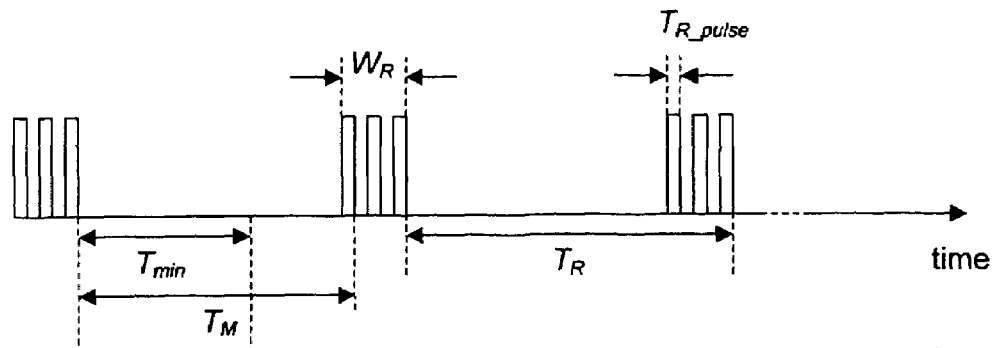
FIG. 3a is a schematic diagram of radar interferences.

In FIG. 3a a typical radar signal is shown. The radar signal exists of very short pulses having a pulse width $T_{R\_pulse}$ in the range of μs. These short pulses periodically occur within certain small time windows $W_R$ in the range of ms. Typically, the period $T_R$ between the end of a first time window $W_R$ and the end of the next time window $W_R$ is in the range of seconds. This means that the radar signal periodically occurs within the small time window $W_R$, while disappearing during a much longer period of time.

In order to reliably detect the radar signal depicted in FIG. 3a by means of interference measurements, the interference measurement period $T_M$ must be longer than the interval between the end of a first radar emission and the beginning of the next radar emission. However, the typical sensing period $T_{min}$ utilized by IEEE 802.11a will usually be shorter than the measurement period $T_M$ required to reliably detect interference from radar signals. This situation is depicted in FIG. 3a. In order to prevent a transmitting unit from interpreting the measurement period $T_M$ of another transmitting unit as idle time, the steps which are outlined below in more detail are initiated by the measuring transmitting unit, i.e., the AP depicted in FIG. 1.

The AP performs quasi-continuous interference measurements as will now be described with reference to FIG. 3b. Each quasi-continuous interference measurement is performed during a measurement period $T_M$ that is comprised of a plurality of partial measurements having durations of $T_t$. The measurement period $T_M$ is briefly interrupted during the transmission of short pulses.

According to the IEEE 802.11a standard, a typical DIFS interval, i.e., sensing period, equals $T_{min}=34$ μs. In order to prevent any other transmitting unit from transmitting while an interference measurement is performed, the interval between the end of a pulse and the beginning of the next pulse, which in the case of the quasi-continuous interference measurement exemplarily described with respect to FIG. 3b corresponds to $T_t$, must not exceed $T_{min}$, i.e. 34 μs. Departing from a preferable pulse duration $T_{pulse} \geq 4$ μs, this means that the duration $T_t$ of a partial measurement must not exceed 30 μs, i.e., $T_t \leq 30$ μs. Since the duration $T_t$ is long compared to the duration $T_{pulse}$ of a single pulse ($T_t \approx 7 \times T_{pulse}$), this leads to a reliable radar detection if the total measurement period $T_M$ of the quasi-continuous interference measurement is somewhat longer than an expected radar period $T_R$ (FIG. 3a). The duration $T_M$ of the measurement period is adapted to the typical interval $T_R$ between two subsequent radar interferences of the most common radar systems or of the expected radar interferences.

Figure 3B:
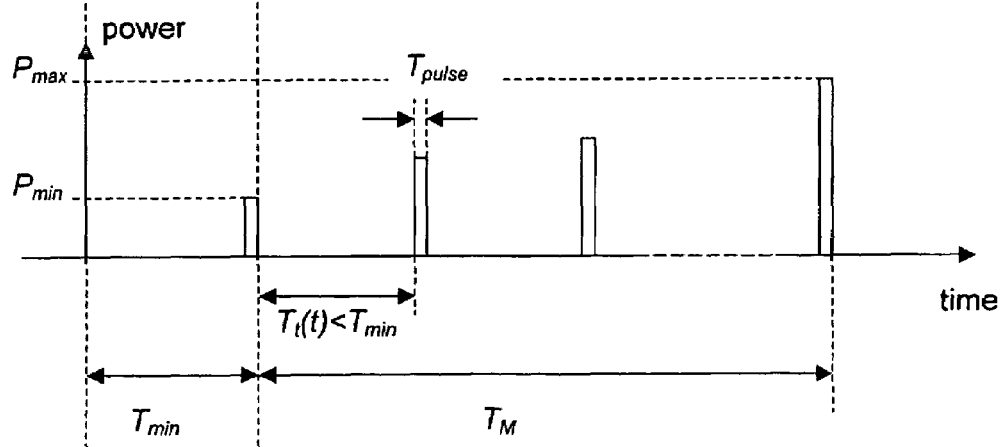
FIG. 3b is a schematic diagram depicting an interference measurement and the transmission of pulses in accordance with an example embodiment.

It should be noted that in the embodiment depicted in FIG. 3b the duration $T_t$ of a partial measurement essentially corresponds to the pulse period. To be exact, the pulse period equals the duration $T_t$ of a partial measurement plus the pulse duration $T_{pulse}$ as can be seen from FIG. 3b. However, the pulses need not necessarily be transmitted periodically. In the case of a periodic pulse transmission, a radar interference may be hidden forever if by chance the radar interference occurs with the same period and phase as the pulses. Therefore, the duration $T_t(t)$ of a partial measurement could vary within a specific range $T_t(t) \in [T_0, T_{min}]$, with $T_0 > 0$. In the case of an IEEE 802.11a system $T_t(t)$ might be randomly varied within the range $T_t(t) \in (25$ μs, $34$ μs$)$.

Such a variation of $T_t(t)$ in dependence of time t can be randomly accomplished. To reduce the overall transmit times and to ensure long continuous measurement times, i.e., a long duration $T_t$ of the partial measurements, $T_0$ shall be high enough. Such a variation of $T_t(t)$ within a limited range corresponds to a quasi-periodic pulse transmission because in this embodiment it means that during transmission of the pulses the interval between the end of a pulse and the beginning of the next pulse is varied accordingly.

In many situations it will be necessary to distinguish an interference from an IEEE 802.11a system component from other interferences like the radar interferences. To that end, the AP may try to decode the interference, especially in the case of high interference. If an assessment of such a high interference shows that the interference cannot be decoded, this means that an external interferer like a radar system is detected. In such a case the interference measurement is stopped for the current carrier and a new carrier is subjected to an interference measurement. Optionally, the interference measurement could be continued for a certain period of time in the order of seconds to assess the interference further. For example the interference may be assessed further with respect to the question whether it has radar typical properties such as a small duration and a constant period. During transmission of the pulses the transmit power of the pulses may be varied as depicted in FIG. 3b. As becomes apparent from FIG. 3b, the AP uses power ramping for the transmission of the short pulses, starting with at lower power limit $P_{min}$. Every time the AP detects, i.e., is able to decode, a high interference from an IEEE 802.11a system component with a received field strength in the range of a predefined RDT or above, the AP increases the transmit power by AP up to an upper power limit $P_{max}$. If this power ramping is used during a start-up phase of the AP, $P_{max}$ should not be higher than the maximum transmit power allowed during regular operation of the AP.

By the stepwise power ramping outlined above, IEEE 802.11a system components in close vicinity of the measuring AP are increasingly prevented from transmission, due to the nature of CSMA/CA. The intended effect of the reduced transmit power is to reduce the spatial area where other measuring units of the IEEE 802.11a system or for example a H/2 system are disturbed by the pulse transmission. Hence the probability can be reduced that other measuring units wrongly interpret the pulses as radar interference. If the power ramping is performed during start-up of the AP, the duration of the startup phase and the measurement period $T_M$ can be adaptively extended if IEEE 802.11a interferences are detected.

One or more of the pulses transmitted during the measurement period $T_M$ may carry information. In the embodiment described with reference to FIG. 3b, the pulses having a duration of $T_{pulse}$=4 µs carry no exploitable information. Every second, one of these pulses is replaced by a longer pulse having a duration $T_{pulse\_long}$=20 µs and carrying information indicative of when the carrier will become available again. This information relates to the remaining duration of a start-up phase and/or the remaining duration of the measurement period $T_M$ and is exploited by other IEEE 802.11a system components to avoid continuous scanning and to thus save battery. As an alternative to or in addition to the use of pulses that carry information, the other IEEE 802.11a system component may try to detect the typical sequence of pulses having a duration of 4 µs and stop scanning for a specific period of time upon detection thereof (e.g. 10 s).

It has already been mentioned that the steps described above may either be performed during start-up of the AP or during regular operation thereof. When the AP is switched on, it starts to perform during a start-up phase the interference measurements including the above steps on its own channel or on a set of available channels. In principle it is possible to avoid the start-up phase if there is no or only little traffic in the first time after the AP is switched on. Then the start-up phase is skipped and the first interference measurement is performed during regular operation within periods without traffic.

Figure 3C:
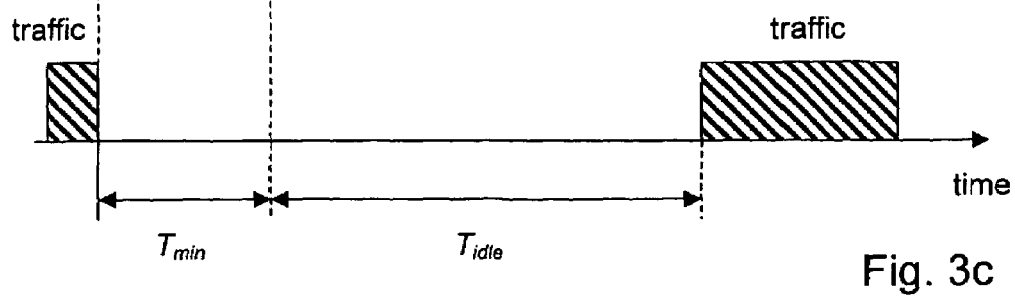
FIG. 3c is a schematic diagram depicting the definition of idle time in a period without any traffic.

After the start up-phase or in the case the start-up phase is skipped, the interference measurements are continued or performed for the first time in a regular operational mode in times without any traffic. To accomplish interference measurements during regular operation, the AP detects start of an idle time and performs an interference measurement until the idle time is over. As can be seen from FIG. 3c, the idle time $T_{idle}$ may start $T_{min}$ after the last detected traffic from the own system and ends with the first detected traffic from the own system. However, the idle time $T_{idle}$ may also start immediately after the last detected traffic from the own system or any other predefined or dynamically selected time interval after the last detected traffic.

Detection of traffic from the own system can be performed by means of trying to decode each signal detected during the measurement period. The reason why the idle time starts only $T_{min}$ after the last detected traffic is the fact that new traffic will most likely start immediately after $T_{min}$. This means that after elapse of $T_{min}$ the likelihood that the measurement period will immediately be aborted due to newly detected traffic is reduced compared to the case that the idle time starts immediately after the last detected traffic.

As has become apparent from the above, during regular operation the interference measurement is immediately aborted upon detection of new traffic from the own system. This means that the measurement period $T_M$ during regular operation is not constant but may vary over a wide range. On the other hand, during start-up a measurement period $T_M$ of a predefined length is employed. As has been discussed above, such a predefined measurement period $T_M$ may be adaptively extended if necessary.

If the idle times are only rarely distributed over time because of a too high traffic load, the AP may switch to startup mode again and a further interference measurement may be performed during the newly initiated start-up phase of the AP. The decision to switch back to the start-up phase in the case of high traffic load shall be performed quickly in order not to disturb a radar system unnecessarily long.

Radar detection by the AP will be significantly disturbed when any other interference for example from another IEEE 802.11a system component is received with a field strength at least higher than the RDT. Thus in order not to be disturbed by other system components during the start-up phase, no other system component closer than an avoidance distance $d_a$ to the measuring AP shall transmit (see FIG. 4).

Departing from exemplary IEEE 802.11a maximum transmit power levels of $P_T$=23 dBm and $P_T$=30 dBm, calculations show that $d_a \approx 70$ m and $d_a \approx 150$ m, respectively. Transmitting units outside of this area will not disturb the radar detection. It is therefore only necessary that during the start-up phase the pulses are transmitted with a power just high enough so that other system components with a distance $d \leq d_a$ from the AP detect this channel to be already used. According to the IEEE 802.11a standard, a channel is sensed to be occupied if the received power is higher than $P_s$=−82 dBm. This means that using the free space propagation model $L(d) = 47.3 + 20 \times lg(d)$ the transmit power $P_{start-up}$ during the start-up phase can be formulated as follows $$P_{start-up} = P_s + L(d_a)$$

wherein $P_{start-up} \approx 2$ dBm and $P_{start-up} \approx 9$ dBm for $d_a$=70 m and $d_a$=150 m, respectively. This transmit power $P_{start-up}$ is significantly lower than the maximum allowed transmit power but is just high enough to avoid significant interference from system components and the close vicinity.

Now the critical distance $d_c$ is considered, below which the AP in the start-up phase disturbs another measuring unit (IEEE 802.11a or H/2) such that a radar interference may erroneously be detected (see FIG. 4). For $P_{start-up}$=2 dBm and $P_{start-up}$=9 dBm, calculations show that $d_c$=6 m and $d_c$=14 m, respectively. Consequently, the pulses transmitted during the start-up phase may only be interpreted as interference resulting from radar systems if the measuring unit is closer than 6 m or 14 m, respectively, to the transmitting AP.

Figure 4:
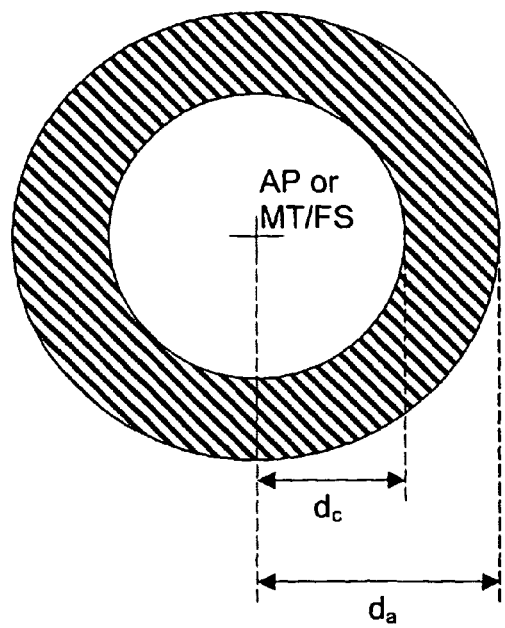
FIG. 4 is a schematic diagram depicting the critical disturbing distance for interference measurements.

As becomes apparent from FIG. 4, a transmitting unit outside the dashed area will not disturb the measurements of the AP. On the other hand, measuring units outside the inner area will not be disturbed by the transmitting AP.

In order to further reduce the probability that the pulses transmitted by the AP during an interference measurement are erroneously interpreted as radar interference, the received pulses may be analyzed. The typical pulse sequence described above with a short period at most 34 μs and a short pulse length $T_{pulse}$=4 μs, and the rather long transmit interval $T_M \approx 10$ s, is vary untypical for radar interference and can thus easily be identified as non-radar interference. Such an analysis of the received pulse sequence may not only be implemented by IEEE 802.11a systems, but also by other systems like H/2 systems. The probability that the pulses transmitted during an interference measurement disturb other system components of the IEEE 802.11a system or any other system can be further reduced if the system components additionally use DFS.

When the comparatively long start-up phase prevents other system components in the close vicinity from communicating, the available system capacity is reduced. If possible, the start-up phase should therefore be avoided. As has been discussed above, this could be the case when the traffic load on the channel is low, such that sufficient long interference measurements ($T_M \approx 10$ s) within the idle time of the channel can be accomplished. The AP may thus first try to measure during the idle time and only in the case of too high traffic load the start-up phase may be initiated.

Figure 5:
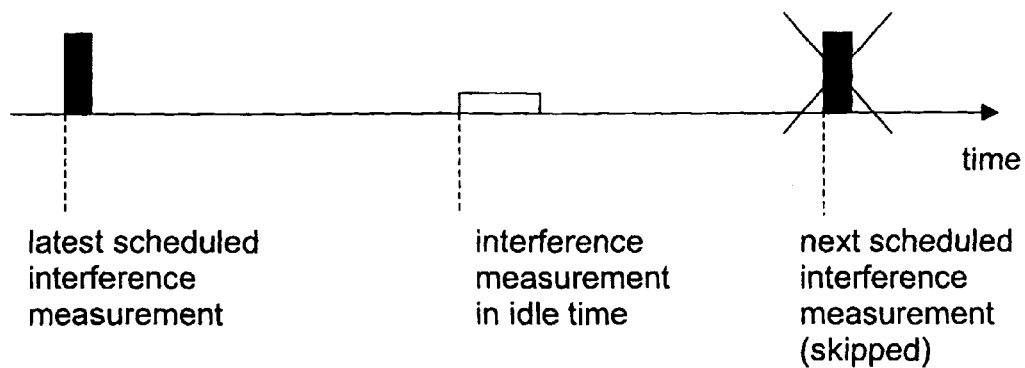
FIG. 5 shows an interference measurement according to an example embodiment during idle time.

In addition to interference measurements during the start-up phase and/or during idle times of regular system operation, further interference measurements may be scheduled as depicted in FIG. 5. The time interval between such further interference measurements may be in the order of hours and need not be very strict. In order to reduce capacity loss due to such additional interference measurements, an further interference measurement may be skipped for example when the AP has already measured in a regular operational mode for a long time interval ($T_M \approx 10$ s) during a time of low traffic load shortly before the newly scheduled further measurement. The same applies if the further measurements are regular system start-up phases.

Although the technology has been described above with respect to an IEEE 802.11a system performing quasi-continuous interference measurements in the 5 GHz frequency band, the invention is neither restricted to IEEE 802.11a systems nor to continuous interference measurements. Moreover, the invention may also be practiced in frequency bands different from the 5 GHz frequency band. Also, the invention may not only be implemented for AP and MT/FS, which perform frequency selection, but also for other system components which do not perform frequency selection, like the MTs depicted in FIGS. 1 and 2.

Modifications and alternative embodiments of the invention are contemplated which do not depart from the spirit and scope of the invention as defined by the foregoing teaching and appended claims. It is intended that the claims cover all such modifications that fall within their scope.

The invention claimed is:

1. A method of performing an interference measurement in a multiple access wireless communications system utilizing a carrier sensing technique for monitoring during a sensing period if a carrier is idle, comprising:

performing a continuous or quasi-continuous interference measurement on the carrier during a measurement period which is longer than the sensing period; and
while performing the interference measurement, transmitting pulses on the carrier such that an interval between the end of a pulse and the beginning of the next pulse does not exceed the sensing period.

2. The method of claim 1, wherein the interference measurement relates to detection of at least interference from radar signals, and wherein the measurement period is chosen such that the likelihood of detecting such interference is significant.

3. The method of claim 1, wherein the duration of the pulses is short compared to the measurement period.

4. The method of claim 1, wherein during transmission of the pulses the interval between the end of a pulse and the beginning of the next pulse is varied.

5. The method of claim 1, wherein during transmission of the pulses a transmit power of the pulses is varied.

6. The method of claim 5, wherein the transmit power is varied in dependence of detection of decodable interference during the measurement period.

7. The method of claim 1, wherein one or more pulses which carry information are transmitted.

8. The method of claim 7, wherein the transmitted information comprises information indicative of when the carrier will become available again.

9. The method of claim 7, wherein while performing the interference measurement pulses of a first type which do not carry any exploitable information are transmitted, and wherein the one or more pulses which carry information are of a second type and are transmitted in addition to or instead of one or more pulses of the first type.

10. The method of claim 1, wherein a detected interference signal is assessed with respect to the fact whether it originates from a transmitting unit belonging to this or a neighboring wireless communications system or from a different interferer.

11. The method of claim 10 wherein the assessment comprises decoding of the interference signal.

12. The method of claim 1, wherein upon detection of an interference signal the course of the further interference measurement is made dependent of the nature of the detected interference signal.

13. The method of claim 1, wherein the method is performed during at least one of start-up of a transmitting unit and in a regular transmission mode during an idle time with no traffic on the carrier.

14. The method of claim 13, wherein interference measurements are performed in a scheduled manner, and wherein, if an unscheduled interference measurement is performed in the regular transmission mode, a subsequent scheduled interference measurement is skipped.

15. The method of claim 1, wherein the interference measurement and the pulse transmission are performed by one and the same device of the wireless communications system or by separate devices in communication with each other.

16. A method of detecting interference from radar in a multiple access wireless communications system, comprising:
monitoring by means of a carrier sensing technique during a sensing period if a carrier is idle;
performing a continuous or quasi-continuous interference measurement on the carrier to detect radar, wherein the interference measurement is performed during a measurement period and wherein this measurement period is longer than the sensing period;

transmitting pulses on the carrier while performing the interference measurement, wherein the pulses are transmitted such that an interval between the end of a pulse and the beginning of the next pulse does not exceed the sensing period; and varying during transmission of the pulses at least one of a transmit power of the pulses and an interval between the end of a pulse and the beginning of the next pulse.

17. A computer readable medium embodied with a set of computer executable program codes, wherein the set of codes comprising:

program code means for monitoring during a sensing period if a carrier is idle utilizing a carrier sensing technique;

program code means for performing a continuous or quasi-continuous interference measurement, on the carrier, wherein the interference measurement is performed during a measurement period and wherein the measurement period is longer than the sensing period; and program code means for transmitting, while performing the interference measurement, pulses on the carrier, wherein the pulses are transmitted such that an interval between the end of a pulse and the beginning of the next pulse does not exceed the sensing period.

18. The computer readable medium embodied with a set of computer executable program codes, wherein the set of codes of claim 17, stored on a computer readable recording medium.

19. A transmitting unit of a multiple access wireless communications system utilizing a carrier sensing technique for monitoring during a sensing period if a carrier is idle, comprising a subunit for transmitting pulses on the carrier during a measurement period which is longer than the sensing period such that an interval between the end of a pulse and the beginning of the next pulse is typically shorter than the sensing period.

20. A transmitting device of a multiple access wireless communications system utilizing a carrier sensing technique for monitoring during a sensing period if a carrier is idle, the transmitting device comprising a first subunit for transmitting on the carrier during a measurement period which is longer than the sensing period pulses such that an interval between the end of a pulse and the beginning of the next pulse is shorter than the sensing period, and a second subunit for varying during the transmission of the pulses at least one of a transmit power of the pulses and an interval between the end of a pulse and the beginning of the next pulse.

21. A wireless communications system comprising:

a transmitting unit for transmitting on a carrier that is monitored during a sensing period to determine if the carrier is idle, wherein the transmission includes pulses that are transmitted during a measurement period which is longer than the sensing period and that are transmitted such that an interval between the end of a pulse and the beginning of the next pulse is shorter than the sensing period; and a measurement unit for performing a continuous or quasi-continuous interference measurement during the measurement period.

22. The wireless communications system of claim 21, wherein the unit for performing the interference measurement is a subunit of the transmitting unit or a unit separate from the transmitting unit.

* * * * *